US008923312B2

United States Patent
Chen et al.

(10) Patent No.: US 8,923,312 B2
(45) Date of Patent: Dec. 30, 2014

(54) OSPF NONSTOP ROUTING SYNCHRONIZATION NACK

(75) Inventors: Ing-Wher Chen, San Jose, CA (US); Wenhu Lu, San Jose, CA (US); Alfred C. Lindem, III, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 134 days.

(21) Appl. No.: 13/345,508

(22) Filed: Jan. 6, 2012

(65) Prior Publication Data

US 2013/0083692 A1    Apr. 4, 2013

Related U.S. Application Data

(60) Provisional application No. 61/541,064, filed on Sep. 29, 2011.

(51) Int. Cl.
| | | |
|---|---|---|
| H04L 12/56 | (2006.01) | |
| H04L 12/703 | (2013.01) | |
| H04L 12/755 | (2013.01) | |
| H04L 12/775 | (2013.01) | |
| H04L 12/773 | (2013.01) | |
| H04B 7/212 | (2006.01) | |
| H04L 12/707 | (2013.01) | |

(52) U.S. Cl.
CPC ............. *H04L 45/28* (2013.01); *H04L 45/021* (2013.01); *H04L 45/58* (2013.01); *H04L 45/60* (2013.01); *H04L 45/22* (2013.01)
USPC ............................................ 370/401; 714/12

(58) Field of Classification Search
None
See application file for complete search history.

(56) References Cited

U.S. PATENT DOCUMENTS

| | | |
|---|---|---|
| 6,856,627 B2 | 2/2005 | Saleh et al. |
| 6,950,427 B1 | 9/2005 | Zinin |
| 6,980,537 B1 | 12/2005 | Liu |
| 6,985,959 B1 | 1/2006 | Lee |
| 7,065,059 B1 | 6/2006 | Zinin et al. |
| 7,095,747 B2 | 8/2006 | Sarmiento et al. |
| 7,117,241 B2 | 10/2006 | Bloch et al. |
| 7,248,579 B1 | 7/2007 | Friedman |
| 7,292,535 B2 | 11/2007 | Folkes et al. |
| 7,363,387 B1 | 4/2008 | Chandra et al. |

(Continued)

FOREIGN PATENT DOCUMENTS

EP        1365551 A1        11/2003

OTHER PUBLICATIONS

OSPF NSR, Cisco Systems, Inc., Jun. 10, 2011, 6 pages.

(Continued)

*Primary Examiner* — Un C Cho
*Assistant Examiner* — M Mostazir Rahman
(74) *Attorney, Agent, or Firm* — Blakely Sokoloff Taylor & Zafman, LLP

(57) ABSTRACT

A network element is configured for synchronizing dynamic OSPF data between an active OSPF instance and a backup OSPF instance. Upon an OSPF data synchronization event, the active OSPF instance synchronizes dynamic OSPF data with the backup OSPF instance. Upon receiving the dynamic OSPF data, the backup OSPF instance determines whether the requisite data structures exist. If the data structures do not exist, the backup OSPF instance returns a NACK to the active OSPF instance and clears its dynamic OSPF data. Responsive to receiving the NACK, the active OSPF instance resynchronizes its dynamic OSPF data with the backup OSPF instance.

8 Claims, 4 Drawing Sheets

(56) References Cited

U.S. PATENT DOCUMENTS

| | | |
|---|---|---|
| 7,391,730 B1 | 6/2008 | Chandra et al. |
| 7,573,811 B2 | 8/2009 | Koppol |
| 7,639,680 B1 * | 12/2009 | Roy et al. ............... 370/389 |
| 7,787,364 B2 | 8/2010 | Maeda et al. |
| 7,804,770 B2 | 9/2010 | Ng |
| 7,940,650 B1 | 5/2011 | Sandhir et al. |
| 8,199,646 B1 | 6/2012 | Cain |
| 8,428,003 B1 | 4/2013 | Chen et al. |
| 2002/0191616 A1 | 12/2002 | Sarmiento et al. |
| 2002/0196794 A1 | 12/2002 | Bloch et al. |
| 2003/0056138 A1 | 3/2003 | Ren |
| 2003/0218982 A1 * | 11/2003 | Folkes et al. ............ 370/238 |
| 2004/0042395 A1 * | 3/2004 | Lu et al. ................. 370/225 |
| 2004/0136371 A1 | 7/2004 | Muralidhar et al. |
| 2005/0105524 A1 | 5/2005 | Stevens et al. |
| 2005/0265260 A1 | 12/2005 | Zinin et al. |
| 2005/0265346 A1 | 12/2005 | Ho et al. |
| 2006/0215547 A1 | 9/2006 | Koppol |
| 2007/0245034 A1 | 10/2007 | Retana et al. |
| 2008/0056294 A1 | 3/2008 | Maeda et al. |
| 2009/0086622 A1 | 4/2009 | Ng |
| 2009/0116514 A1 | 5/2009 | Yan et al. |
| 2009/0129398 A1 * | 5/2009 | Riegel et al. ............ 370/401 |
| 2009/0279536 A1 | 11/2009 | Unbehagen et al. |
| 2009/0288098 A1 | 11/2009 | Abd-El-Malek et al. |
| 2010/0054153 A1 | 3/2010 | White et al. |
| 2010/0254262 A1 * | 10/2010 | Kantawala et al. ........ 370/232 |
| 2011/0026460 A1 | 2/2011 | Lafuente |
| 2011/0231578 A1 | 9/2011 | Nagappan et al. |
| 2013/0070604 A1 | 3/2013 | Lu et al. |
| 2013/0070637 A1 | 3/2013 | Lindem et al. |
| 2013/0073741 A1 | 3/2013 | Lindem et al. |
| 2013/0083802 A1 | 4/2013 | Chen et al. |

OTHER PUBLICATIONS

J. Moy, OSPF Version 2, Network Working Group, Request for Comments: 2328, Apr. 1998, 245 pages.

Non-Final Office Action, U.S. Appl. No. 13/310,653, dated May 13, 2013, 31 pages.

Non-Final Office Action, U.S. Appl. No. 13/310,656, dated Jul. 9, 2013, 23 pages.

Non-Final Office Action, U.S. Appl. No. 13/349,530, dated Jul. 15, 2013, 12 pages.

Final Office Action, U.S. Appl. No. 13/310,653, dated Sep. 25, 2013, 34 pages.

Notice of Allowance, U.S. Appl. No. 13/349,530; dated Apr. 14, 2014; 12 pages.

Non-Final Office Action, U.S. Appl. No. 13/350,234; dated Apr. 25, 2014; 21 pages.

Tsai, Chia-Tai et al., "Implementation of Highly Available OSPF Router on ACTA," 2007; pp. 147-154; 13th IEEE International Symposium on Pacific Rim Dependable Computing; IEEE Computer Society; Washington D.C., USA.

Final Office Action, U.S. Appl. No. 13/310,656, dated Oct. 25, 2013; 29 pages.

Final Office Action, U.S. Appl. No. 13/349,530, dated Dec. 11, 2013; 16 pages.

Notice of Allowance, U.S. Appl. No. 13/310,653, dated Dec. 19, 2013; 38 pages.

European Search Report for EP Application No. 12184033.4, mailed Sep. 30, 2013; 5 pages.

* cited by examiner

OSPF NONSTOP ROUTING SYNCHRONIZATION NACK

CROSS-REFERENCE TO RELATED APPLICATIONS

This application claims the benefit of U.S. Provisional Application No. 61/541,064, filed Sep. 29, 2011 which is hereby incorporated by reference.

FIELD

Embodiments of the invention relate to the field of computer networking; and more specifically, to synchronization of dynamic Open Shortest Path First (OSPF) data in Nonstop Routing (NSR).

BACKGROUND

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over a larger geographic area using links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol described in *Request for Comments (RFC)* 2328, *OSPF Version 2*, by J. Moy (1998). The OSPF protocol is based on link-state technology and, therefore, is hereinafter referred to as a link state routing protocol.

SUMMARY

A network element is configured for synchronizing dynamic open shortest path first (OSPF) data between an active OSPF instance and a backup OSPF instance. The active OSPF instance determines that a first dynamic OSPF data synchronization event has occurred and determines a first set of OSPF synchronization data to synchronize with the backup OSPF instance. The first set of OSPF synchronization data is based on a subset of dynamic OSPF data in the active OSPF instance that needs synchronization to the backup OSPF instance. The active OSPF instance communicates the first set of OSPF synchronization data to the backup OSPF instance. The backup OSPF instance receives the first set of OSPF synchronization data and determines whether a data structure exists in the backup OSPF instance that is required for the synchronization of the subset of dynamic OSPF data. If the data structure exists, the backup OSPF instance adds the subset of dynamic OSPF data to the data structure. If the data structure does not exist, the backup OSPF instance returns a negative acknowledgement (NACK) to the active OSPF instance. The NACK indicates that dynamic OSPF data synchronization failed. Furthermore, the backup OSPF instance clears dynamic OSPF data from the backup OSPF instance. Responsive to receiving the NACK, the active OSPF instance determines that a second dynamic OSPF data synchronization event has occurred. The active OSPF instance then determines a second set of OSPF synchronization data based on dynamic OSPF data in the active OSPF instance and communicates the second set of OSPF synchronization data to the backup OSPF instance.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
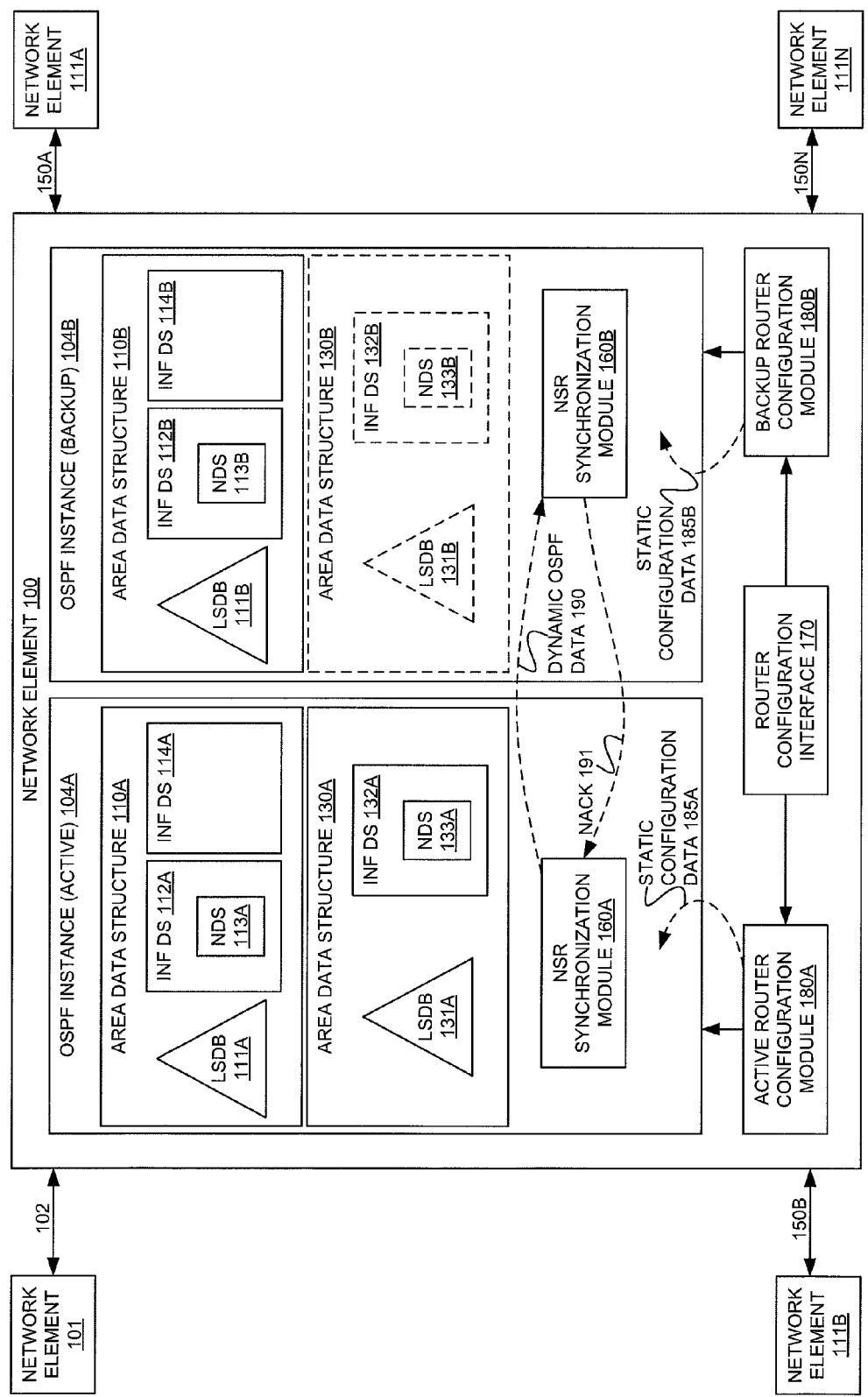
FIG. 1 illustrates an exemplary network that implements OSPF Nonstop Routing (NSR) with synchronization of dynamic OSPF data according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (ISIS)), Label Distribution Protocol (LDP), Resource Reservation Protocol (RSVP)) that communicate with other network elements to exchange routes and select those routes based on one or more routing metrics.

Each network element running the OSPF protocol maintains an identical link state database (LSDB) describing the topology of the autonomous system (AS). Each individual piece of the LSDB is a particular network element's local state, e.g., the network element's usable interfaces and reachable neighbors or adjacencies. As used herein, neighboring network elements (or "neighbors") are two network elements that have interfaces to a common network, wherein an interface is a connection between a network element and one of its attached networks. Moreover, an adjacency is a relationship formed between selected neighboring network elements for the purpose of exchanging routing information and abstracting the network topology. One or more network element adjacencies may be established over an interface.

The adjacencies are established and maintained through the use of the well-known Hello protocol. Broadly stated, the Hello protocol ensures that communication between neighbors is bi-directional by periodically sending Hello packets out of all of the network element interfaces. Bi-directional communication is indicated when the network element "sees" itself listed in the neighbor's Hello packet. On broadcast and non-broadcast multi-access (NBMA) networks, the Hello protocol elects a designated router (DR) and backup designated router (BDR) for the network.

Once a network element becomes adjacent, it notifies other network elements on the network by sending link state advertisements (LSAs). These LSAs are distributed through a process called reliable flooding, in which a first network element receives a new instance of an LSA from a second network element and forwards the LSA to all of its neighbor network elements, except the second network element if the first network element received the LSA from that network element.

For greater reliability, some OSPF implementations use a technique called Nonstop Routing (NSR), in which state is synchronized between an active and backup OSPF instance to assure that a failure on the active OSPF instance and switchover to the backup OSPF instance does not result in any loss of OSPF protocol synchronization.

Typically, the state must be synchronized between OSPF instances using Inter-Process Communication (IPC) which is much slower than normal memory access. As the complexity of supporting various configurations of active and backup OSPF instances increases, so does the need to support NSR OSPF synchronization occurring at various stages of processing. For example, it is desirable to recover from errors in the NSR OSPF synchronization due to timing issues between the active OSPF instance and backup OSPF instance.

In one embodiment, a network element includes at least two OSPF instances, where a first one acts as an active OSPF instance (or sometimes referred to as a primary OSPF instance) and the second one acts as a backup OSPF instance (or sometimes referred to as a standby OSPF instance or secondary OSPF instance). The active and backup OSPF instances may be executed by routing processors (RPs) on different hardware or the same hardware. For example, one of the OSPF instances may be executed by an RP on a first control card while the other OSPF instance is executed by an RP on a second control card. As another example, the OSPF instances may be executing on different cores of a single processor. As yet another example, the OSPF instances may be running on different processors on the same card.

During participation in an OSPF network, the active OSPF instance receives, and generates, dynamic OSPF data that is used to modify the active OSPF instance's state and this dynamic OSPF data is synchronized with the backup OSPF instance to modify the backup OSPF instance's state.

FIG. 1 illustrates an exemplary network that implements OSPF Nonstop Routing (NSR) with synchronization of dynamic OSPF data according to one embodiment. The network includes the network elements 100, 101, and 111A-111N. The network element 100 includes the OSPF instances 104A and 104B, where the OSPF instance 104A is currently acting as the active OSPF instance and the OSPF instance 104B is currently acting as the backup OSPF instance in an NSR implementation. The network element 100 further includes a router configuration interface 170 that is capable of providing an interface to an administrative user for entering static data such as OSPF configuration data. In one embodiment, the router configuration interface 170 provides a command line interface while in another embodiment it provides a graphical user interface.

The router configuration interface 170 is coupled with an active router configuration module (RCM) 180A and is coupled with a backup RCM 180B. While the network element 100 is in operation, configuration events occur that cause the configuration of the active OSPF instance 104A, the backup OSPF instance 104B, or both. In response to configuration events, the active RCM 180A applies the static configuration data 185A to the active OSPF instance 104A while the backup RCM 180B applies the static configuration data 185B to the backup OSPF instance 104B.

The static configuration data includes area definitions and interface definitions. The area definitions specify a group of contiguous networks and hosts and each area definition includes one or more interface definitions that each specifies an interface used by OSPF for that area. A RCM, either active RCM 180A or backup RCM 180B, uses the static configuration data 185A or 185B to initialize one or more areas and/or interfaces.

As shown in FIG. 1, the active RCM 180A has used the static configuration data 185A to initialize two areas in the active OSPF instance 104A. As an area is initialized, an area data structure (ADS) and an LSDB are initialized and associated with that area. In FIG. 1, the active OSPF instance 104A includes a first area associated with a first ADS 110A and a second area associated with a second ADS 130A. The first ADS 110A is associated with a first LSDB 111A while the second ADS 130A is associated with a second LSDB 131A.

Furthermore, the active RCM 180A has used the static configuration data 185A to initialize two interfaces associated with the first area and one interface associated with the second area. As each interface is initialized, an interface data structure (INF DS) is initialized that is associated with that interface. The INF DS includes information associated with the corresponding interface, some of which is determined from the static configuration data and some of which is determined from dynamic OSPF data received at the OSPF instance during the OSPF instance's participation in the OSPF network. In FIG. 1, the first ADS 110A is associated with a first INF DS 112A and a second INF DS 114A. Furthermore, the second ADS 130A is associated with a third INF DS 132A.

In FIG. 1, the first INF DS 112A is associated with a neighbor data structure (NDS) 113A that was generated based on OSPF Hello Protocol communication with the other network elements 101, and 111A-111N. Furthermore, the third INF data structure 132A is associated with an NDS 133A also generated based on OSPF Hello Protocol communication. The Hello Protocol is further capable of determining a designated router and a backup designated router for each interface. Thus, an interface designated router (INF DR) or an interface backup designated router (INF BDR) might be associated with each interface in that interface's data structure. While not shown in FIG. 1, the network element 100 further receives LSAs from its neighboring network elements. For example, the network element 100 receives LSA(s) from the network element 101 over the link 102. Specifically, the OSPF instance 104A receives LSA(s) from the network element 101 over the link 102. The OSPF instance 104A processes the received LSAs including storing the information from the LSA into an LSDB corresponding to the area associated with the source network element; in this case the source network element being network element 101.

With respect to the backup OSPF instance 104B, the backup RCM 180B has used the static configuration data 185B, which is substantially similar to the static configuration data 185A, to initialize one area in the backup OSPF instance 104B. The backup OSPF instance 104B includes a first area associated with a first ADS 110B. The first ADS 110B is associated with a first LSDB 111B. However, the static configuration data 185B further includes configuration information for initializing a second area in the backup OSPF instance 104B, thereby matching the configuration of the active OSPF instance 104A. However, at the point shown in FIG. 1, the second area in the backup OSPF instance 104B is not yet initialized. Therefore, FIG. 1 shows, in dashed markings, a second ADS structure 130B that is associated with a second LSDB 131B and a second INF DS 132B. These elements are dashed to indicate that, though those elements will be present once the second area and third interface are initialized, they are not currently present in the backup OSPF instance 104B.

As described above, it is important for the active OSPF instance 104A to synchronize its state information with the backup OSPF instance 104B. The state information includes the dynamic OSPF data generated or received during participation in the OSPF network that is contained in the ADSs 110A and 130A; the INF DSs 112A, 114A, and 132A; and the LSDBs 111A and 131A. To effectuate the synchronization of the dynamic OSPF data, the active OSPF instance 104A includes an active NSR synchronization module 160A that performs NSR state synchronization with a backup NSR synchronization module 160B in the backup OSPF instance 104B.

FIG. 1 illustrates dynamic OSPF data 190 being synchronized from the active NSR synchronization module 160A to the backup NSR synchronization module 160B. Specifically, the dynamic OSPF data 190 includes information for synchronizing NDS 133A to the, not yet initialized, second area. Upon receiving the dynamic OSPF data associated with NDS 133A, the backup NSR synchronization module 160B will recognize that INF DS 132B corresponding with the interface associated with NDS 133A does not exist.

In one embodiment, the backup NSR synchronization module 160B will be unable to generate an NDS 133B in association with INF DS 132B since INF DS 132B does not yet exist. Since the synchronization will have failed, the backup NSR synchronization module 160B will send a NACK 191 to the active NSR synchronization module 160A in response to that failure. The backup NSR synchronization module 160B expects for the active NSR synchronization module 160A to react to the NACK 191 by initiating a resynchronization of all dynamic OSPF data represented in the ADSs 110A and 130A; the INF DSs 112A, 114A, and 132A; and the LSDBs 111A and 131A. In anticipation of the resynchronization of the dynamic OSPF data from the active OSPF instance 104A, the backup OSPF instance 104B clears all of its dynamic OSPF data. Specifically, the backup OSPF instance 104B deletes NDS 113B and clears previously synchronized dynamic OSPF data from ADS 110B; the INF DSs 112B and 114B; and the LSDB 111B. After a set amount of time, the active NSR synchronization module 160A begins the resynchronization of dynamic OSPF data with the expectation that all requisite initialization on the backup OSPF instance 104B will have occurred.

While the NACK 191 is described specifically in reference to an interface associated with INF DS 132B not being initialized, the NACK approach may be utilized in any scenario in which the backup NSR synchronization module 160B receives some dynamic OSPF data for synchronization at a time in which the received dynamic OSPF data cannot be processed. In other words, the backup NSR synchronization module 160B may send a NACK when receiving dynamic OSPF data associated with an uninitialized area or uninitialized interface. Specifically, the backup NSR synchronization module 160B responds with a NACK if it receives dynamic OSPF data containing an LSA associated with an Area or LSDB that has not yet been created. The backup NSR synchronization module 160B responds with a NACK if it receives dynamic OSPF data containing an INF DR/DBR message associated with an INF DS that has not yet been generated. The backup NSR synchronization module 160B also responds with a NACK if it receives dynamic OSPF data containing an NDS message associated with an INF DS that has not yet been generated. Furthermore, the NACK 191 is useful in the scenario in which the backup NSR synchronization module 160B is unable to process the dynamic OSPF data even if the requisite areas and interfaces are fully initialized; for example, if the backup OSPF instance 104B is not ready to process the dynamic OSPF data.

This approach optimizes for the normal, most frequent case where the backup OSPF instance 104B is ready to process dynamic OSPF data from the active OSPF instance 104A. In the rare case when backup OSPF instance 104B is not ready, the NACK buys time for backup OSPF instance 104B to receive configuration events and initialize the requisite areas, interfaces, and data structures so that it will be ready to process dynamic OSPF data in the future. When the resynchronization occurs, the backup OSPF instance 104B will be ready to process the data. Additionally, a single NACK can cover all possible out-of-order scenarios. Even when resynchronization is triggered, there is little overhead expected because if resynchronization occurs at all, it occurs near the creation of the backup OSPF instance 104B or at an update of the configuration of the backup OSPF instance 104B. These events are expected to be rare.

In another embodiment (not shown), the backup OSPF instance 104B receives the dynamic OSPF data 190 and, in recognition that INF DS 132B does not yet exist, generates a temporary data structure to hold the information included in the dynamic OSPF data 190. This temporary data structure holds the unprocessed dynamic OSPF data 190 until the INF DS 132B is generated during the initialization of the interface associated with INF DS 132B. At that time, the backup NSR synchronization module 160B, or some other process running along with the backup OSPF instance 104B, can determine that INF DS 132B has been created and use the temporary data structure to synchronize NDS 133A with NDS 133B in association with INF DS 132B.

Figure 2:
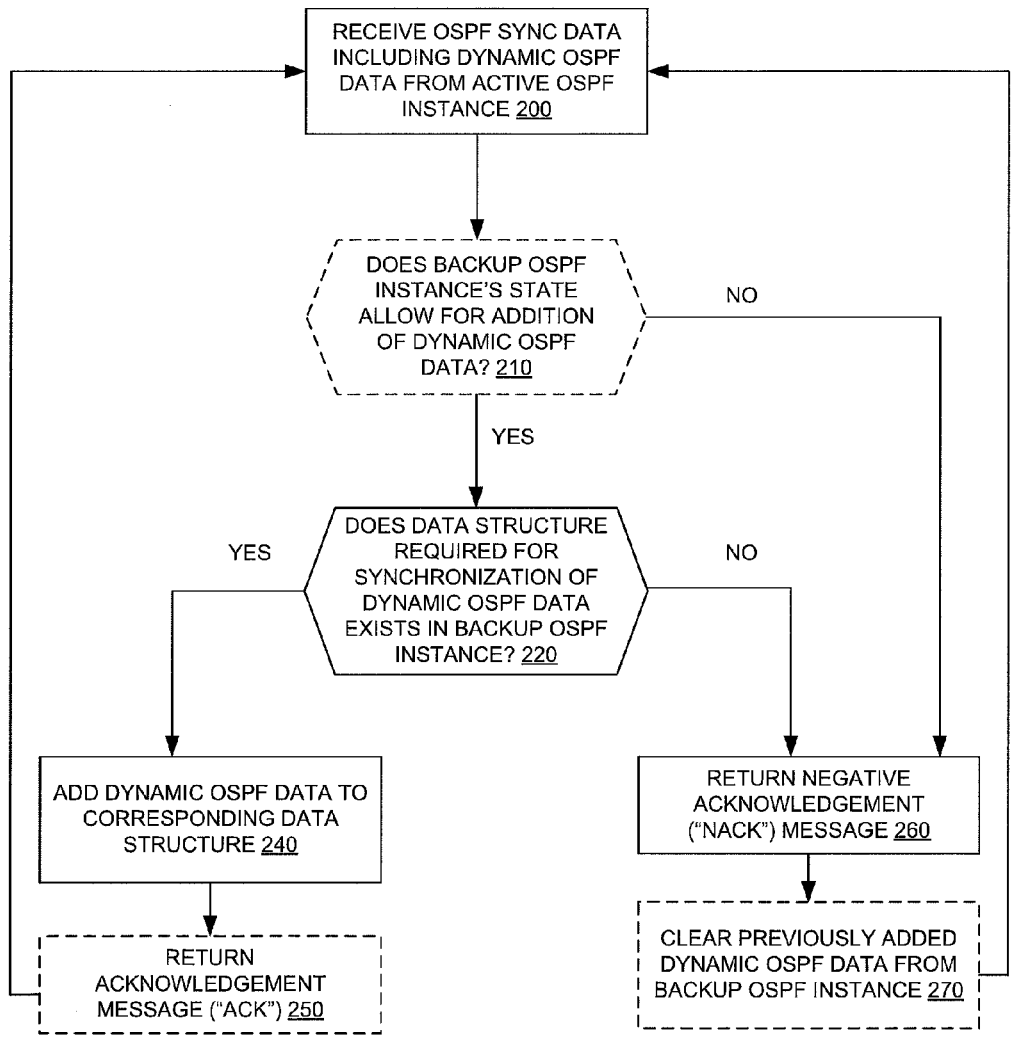
FIG. 2 is a flow diagram that illustrates exemplary operations for responding to synchronization of dynamic OSPF data according to one embodiment.

FIG. 2 is a flow diagram that illustrates exemplary operations for responding to synchronization of dynamic OSPF data according to one embodiment. The operations of this flow diagram and other flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

At operation 200, the backup OSPF instance 104B receives OSPF synchronization data that includes dynamic OSPF data for synchronization from the active OSPF instance 104A. For example, the backup OSPF instance 104B receives LSAs, NDSs, and/or INF DR/BDRs from the active OSPF instance 104A to be synchronized in the backup OSPF instance 104B. Flow optionally moves to operation 210 at which the backup OSPF instance 104B determines whether its state allows for the addition of the dynamic OSPF data. If the backup OSPF instance's 104B state allows for the addition of the dynamic OSPF data, the flow moves to operation 220 otherwise the flow moves to operation 260.

At operation 220, the backup OSPF instance 104B determines whether the data structure(s) associated with the dynamic OSPF data exists. If the data structure(s) exists the flow moves to operation 240 otherwise the flow moves to operation 260. At operation 240, the backup OSPF instance 104B adds the dynamic OSPF data to the corresponding data structure(s) and optionally continues by returning an acknowledgment message at operation 250.

At operation 260, the backup OSPF instance 104B returns a NACK message to the active OSPF instance 104A and optionally continues by clearing previously added dynamic OSPF data from the backup OSPF instance 104B at operation 270.

Figure 3:
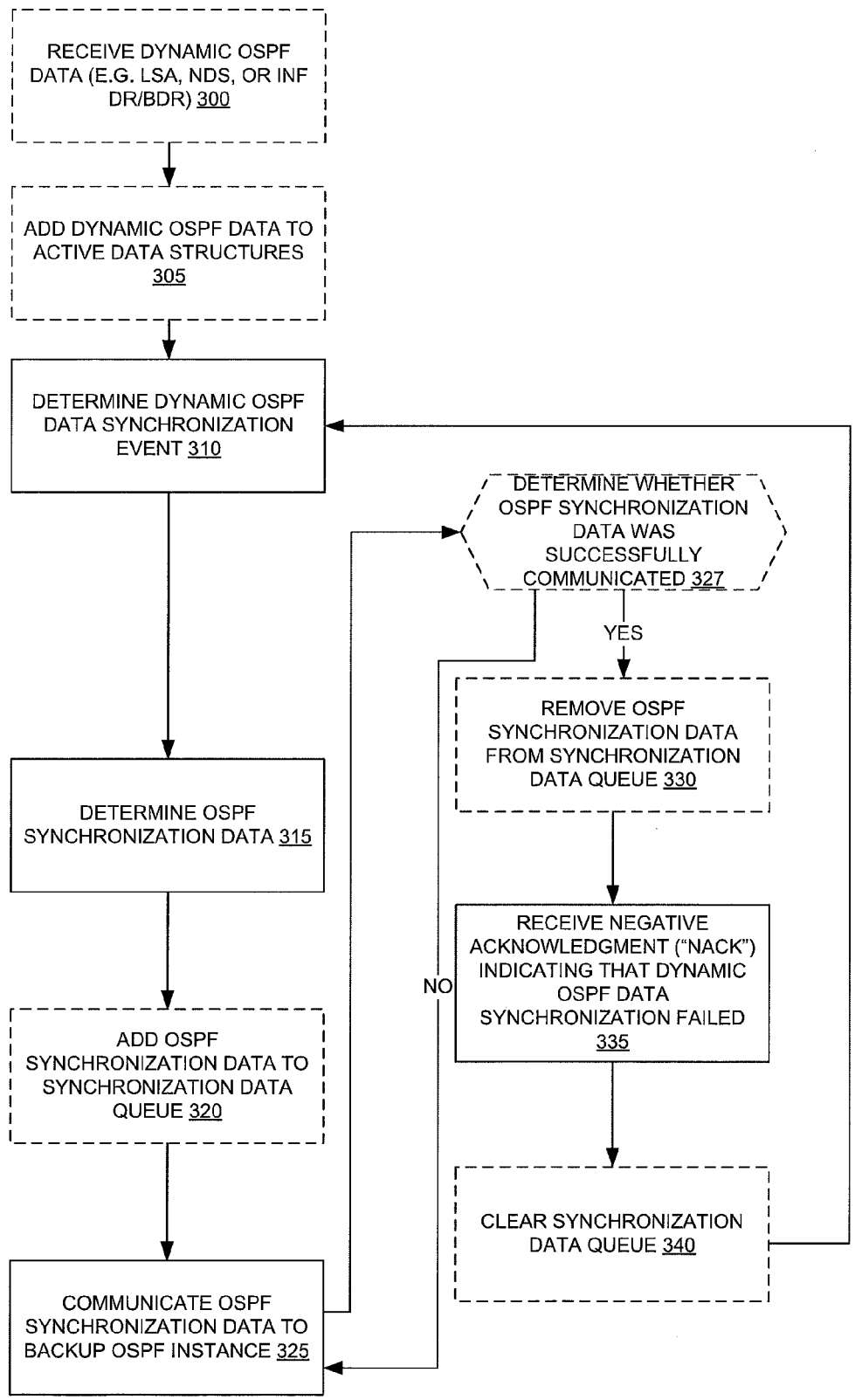
FIG. 3 is a flow diagram that illustrates exemplary operations for synchronizing dynamic OSPF data according to one embodiment.

FIG. 3 is a flow diagram that illustrates exemplary operations for synchronizing dynamic OSPF data according to one embodiment. In cycle of the operations, the flow begins in operation 300 with the active OSPF instance 104A receiving dynamic OSPF data from a neighbor network element. While in another cycle of the operations, the flow begins at operation 310 with the active OSPF determining a dynamic OSPF synchronization event has occurred.

As shown in operation 305, the active OSPF instance 104A receives dynamic OSPF data such as an LSA, NDS, or INF DR/BDR from a neighboring network element. Furthermore, the active OSPF instance 104A adds the dynamic OSPF data to data structures in the active OSPF instance 104A such as ADS 110A, LSDB 111A, or INF DS 112A in operation 305.

With reference to determining that a dynamic OSPF data synchronization event occurred, the active OSPF instance recognizes a number of events as dynamic OSPF data synchronization events. As described with reference to operation 300, the receipt of dynamic OSPF data from a neighbor network element is one such dynamic OSPF data synchronization event. Another dynamic OSPF data synchronization event is when the active OSPF instance 104A generates an LSA for transmission to one or more neighboring network elements. Further, the receipt of a NACK during dynamic OSPF data synchronization with a backup OSPF instance is a dynamic synchronization event.

The flow continues at operation 315 with determining the synchronization data that is to be communicated to the backup OSPF instance 104B. For example, the receipt, or generation, or dynamic OSPF data that needs to be synchronized means the received, or generated, dynamic OSPF data is the synchronization data. However, in the case of receiving a NACK during NSR data synchronization with a backup OSPF instance, all dynamic OSPF data associated with the active OSPF instance must be synchronized and therefore all dynamic OSPF data in the active OSPF instance is the synchronization data. In response to determining the synchronization data, the active OSPF instance 104A optionally adds the synchronization data to a synchronization data queue in operation 320.

Flow continues at operation 325 in which the active OSPF instance 104A communicates the synchronization data to the backup OSPF instance 104B. In at least one embodiment, there is a delay before continuing operation 325 to give the backup OSPF instance 104B an amount of time from which it is expected the backup OSPF instance 104B will be able to utilize the synchronization data. In at least one embodiment, flow continues at operation 327 with determining whether the OSPF synchronization data was successfully communicated to the backup OSPF instance 104B. If the data was not successfully communicated then the flow continues back at operation 325, otherwise the flow continues on to operation 330 for embodiments that utilize a synchronization data queue according to operation 320. At operation 330 the active OSPF instance 104A removes the synchronization data from the synchronization data queue. The flow continues at operation 335 at which time the active OSPF instance 104A receives a NACK from the backup OSPF instance 104B indicating that the synchronization of dynamic OSPF data failed. In response to the receipt of the NACK, the flow continues at operation 340 for embodiments utilizing a synchronization data queue as described in operations 320 and 330. In operation 340, the active OSPF instance 104A clears the synchronization data queue as the active OSPF instance 104A will be resynchronizing all dynamic OSPF data with the backup OSPF instance 104B. In response to receiving the NACK, the operation continues back at 310. However, the dynamic OSPF data synchronization event is now the receipt of the NACK which initiates a resynchronization of all dynamic OSPF data from the active OSPF instance 104A to the backup OSPF instance 104B.

Figure 4:
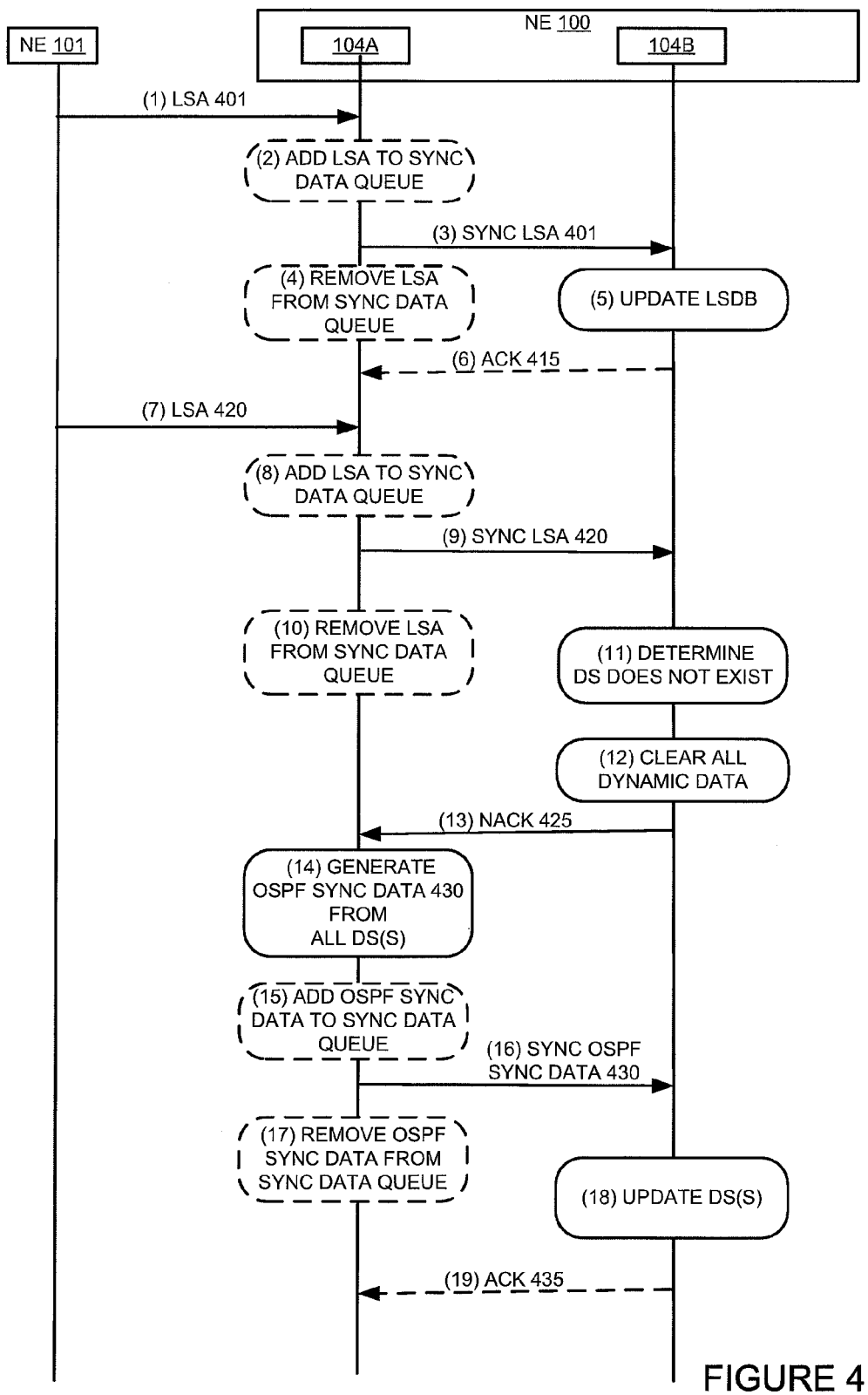
FIG. 4 is a transaction diagram that illustrates exemplary operations for dynamic OSPF data synchronization according to one embodiment.

FIG. 4 is a transaction diagram that illustrates operations for dynamic OSPF data synchronization according to one embodiment. At operation 1, an LSA 401 is received from the network element 101 at the active OSPF instance 104A. Next, at operation 2, the active OSPF instance 104A optionally adds the LSA 401 to a synchronization data queue. Next, at operation 3, the active OSPF instance 104A synchronizes the LSA 401 with the backup OSPF instance 104B and, optionally, removes the LSA 401 from the synchronization data queue at operation 4.

At operation 5, the backup OSPF instance 104B updates an LSBD corresponding to the data included in LSA 401 by adding the LSA 401 to the LSDB or updating data included in the LSDB. At operation 6, the backup OSPF instance 104B optionally sends an ACK message 415 to the active OSPF instance 104A to indicate the successful synchronization of the dynamic OSPF data.

At operation 7, an LSA 420 is received from the network element 101 at the active OSPF instance 104A. Next, at operation 8, the active OSPF instance 104A optionally adds the LSA 420 to a synchronization data queue. Next, at operation 9, the active OSPF instance 104A synchronizes the LSA 420 with the backup OSPF instance 104B and, optionally, removes the LSA 401 from the synchronization data queue at operation 10.

With respect to LSA 420, the backup OSPF instance 104B determines that one or more data structures associated with LSA 420 do not exist at operation 11. Specifically, the backup OSPF instance 104B expects an area and an interface related to the LSA to be initialized and associated data structures to exist in order to process the LSA 420. Therefore, if either the associated area or associated interface is not yet initialized then the backup OSPF instance 104B will determine that one or more of the requisite data structures are not present. This is considered a failed dynamic OSPF data synchronization.

In response to the failed dynamic OSPF data synchronization, the backup OSPF instance 104B clears all previously synchronized dynamic data from its data structures in operation 12 and sends a NACK 425 in operation 13 to inform the active OSPF instance 104A of the synchronization failure.

In response to the NACK 425, the active OSPF instance 104A generates OSPF synchronization data 430 from the dynamic data included the data structures of the active OSPF instance 104A at operation 14. Next, at operation 15, the active OSPF instance 104A optionally adds the OSPF synchronization data 430 to a synchronization data queue. Next, at operation 16, the active OSPF instance 104A synchronizes OSPF synchronization data 430 with the backup OSPF instance 104B and, optionally, removes the OSPF synchronization data 430 from the synchronization data queue at operation 17. In at least one embodiment, there is a delay before continuing operation 16 to give the backup OSPF instance 104B an amount of time from which it is expected the backup OSPF instance 104B will be able to utilize the synchronization data.

At operation 18, the backup OSPF instance 104B updates the corresponding data structures based on the OSPF synchronization data 430. At operation 19, the backup OSPF instance 104B optionally sends an ACK message 435 to the active OSPF instance 104A to indicate the successful synchronization of the OSPF synchronization data.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:
1. A method in a network element for synchronizing dynamic open shortest path first (OSPF) data between an active OSPF instance and a backup OSPF instance, the method comprising the steps of:
  determining that a first dynamic OSPF data synchronization event has occurred at the active OSPF instance;
  determining a first set of OSPF synchronization data based on a subset of dynamic OSPF data in the active OSPF instance, wherein dynamic OSPF data includes data generated during the operation of an OSPF router including data from one or more link state databases, data from one or more interface data structures, and data from one or more neighbor data structures, and wherein the subset of dynamic OSPF data is data that needs synchronization to the backup OSPF instance;
  adding the first set of OSPF synchronization data to a synchronization queue;
  communicating the first set of OSPF synchronization data from the active OSPF instance to the backup OSPF instance;
  receiving the first set of OSPF synchronization data at the backup OSPF instance;
  determining whether a data structure exists in the backup OSPF instance, wherein the data structure is required for the synchronization of the subset of dynamic OSPF data;
  responsive to the data structure existing, adding the subset of dynamic OSPF data to the data structure, wherein the adding includes at least adding data corresponding to a link state database to that link state database, adding data corresponding to an interface data structure to that interface data structure, and adding data corresponding to a neighbor data structure to that neighbor data structure;
  removing the first set of OSPF synchronization data from the synchronization queue in response to successful communication of the first set of OSPF synchronization data to the backup OSPF instance;
  responsive to the data structure not existing, performing the steps of,
    returning a negative acknowledgement (NACK) to the active OSPF instance to indicate dynamic OSPF data synchronization failed, and
    clearing dynamic OSPF data from the backup OSPF instance; and
  responsive to receiving the NACK at the active OSPF instance, performing the steps of,
    clearing the synchronization queue in response to receiving the NACK, determining that a second dynamic OSPF data synchronization event has occurred, wherein the second dynamic OSPF data synchronization event is the receipt of the NACK,
determining a second set of OSPF synchronization data based on dynamic OSPF data in the active OSPF instance, and
communicating the second set of OSPF synchronization data to the backup OSPF instance.

2. The method of claim 1, further comprising the steps of:
receiving a set of dynamic OSPF data from one or more other network elements;
adding the set of dynamic OSPF data to one or more active data structures in the active OSPF instance, wherein the addition of the set of dynamic OSPF data to the one or more active data structures is the first OSPF data synchronization event.

3. The method of claim 1, further comprising the steps of:
determining whether the backup OSPF instance is in a state that allows for the addition of dynamic OSPF data in response to the backup OSPF instance receiving the first set of OSPF synchronization; and
responsive to backup OSPF instance being in a state that does not allow for the addition of dynamic OSPF data, performing the steps of,
returning a NACK to the active OSPF instance to indicate dynamic OSPF data synchronization failed, and
clearing dynamic OSPF data from the backup OSPF instance.

4. A network element supporting open shortest path first (OSPF) non-stop routing (NSR) with an active OSPF instance and a backup OSPF instance, the network element configured to implement:
a router configuration interface to provide an interface to an administrator for entering static OSPF configuration data used to configure the active OSPF instance and the backup OSPF instance, the static OSPF configuration data including area definitions and interface definitions for the network element;
an active router configuration module to respond to configuration events by applying static OSPF configuration data to the active OSPF instance;
a backup router configuration module to respond to configuration events by applying static OSPF configuration data to the backup OSPF instance;
the active OSPF instance to operate an NSR synchronization module to synchronize dynamic OSPF data with the backup OSPF instance responsive to dynamic data synchronization events, wherein dynamic OSPF data includes data generated during the operation of an OSPF router including data from one or more link state databases, data from one or more interface data structures, and data from one or more neighbor data structures, the NSR synchronization module configured to,
maintain a synchronization queue for dynamic OSPF data that will be synchronized with the backup OSPF instance,
resynchronize dynamic OSPF data from the active OSPF instance upon receiving a negative acknowledgement (NACK) from the backup OSPF instance, and
to clear the synchronization queue when a NACK is received from the backup OSPF instance;
the backup OSPF instance to operate an NSR synchronization module to synchronize dynamic OSPF data with the active OSPF instance including adding data corresponding to a link state database to that link state database, adding data corresponding to an interface data structure to that interface data structure, and adding data corresponding to a neighbor data structure to that neighbor data structure, the NSR synchronization module further configured to reply with a NACK to the active OSPF instance when synchronization occurs prior to the backup OSPF instance being in a state in which synchronization is possible.

5. The network element of claim 4 wherein the active OSPF instance is further configured to add a set of dynamic OSPF data received from one or more other network elements to one or more active data structures maintained in that active OSPF instance and wherein the addition of the set of dynamic OSPF data to the one or more active data structures is the first OSPF data synchronization event.

6. A network element supporting open shortest path first (OSPF) non-stop routing (NSR), the network element comprising:
a set of one or more processors;
a memory, coupled with the set of processors, storing instruction that, when executed by the set of processors, cause the set of processors to execute, an active OSPF instance configured to,
determine that a first dynamic OSPF data synchronization event has occurred,
determine a first set of OSPF synchronization data including a subset of dynamic OSPF data in the active OSPF instance, wherein dynamic OSPF data includes data generated during the operation of an OSPF router including data from one or more link state databases, data from one or more interface data structures, and data from one or more neighbor data structures, and wherein the subset of dynamic OSPF data is data that needs synchronization to a backup OSPF instance,
add the first set of OSPF synchronization data to a synchronization queue,
communicate the first set of OSPF synchronization data to the backup OSPF instance,
remove the first set of OSPF synchronization data from the synchronization queue in response to communication of the first set of OSPF synchronization data to the backup OSPF instance, and
responsive to receiving a negative acknowledgement (NACK) from the backup OSPF,
clearing the synchronization queue, and
determining a second set of OSPF synchronization data based on dynamic OSPF data in the active OSPF instance and communicating the second set of OSPF synchronization data to the backup OSPF instance, and
a backup OSPF instance configured to:
receive the first set of OSPF synchronization data from the active OSPF instance,
determine whether a data structure exists that is required for the synchronization of the subset of dynamic OSPF data,
responsive to the data structure existing, add the subset of dynamic OSPF data to the data structure, wherein the addition includes at least the addition of data corresponding to a link state database to that link state database, data corresponding to an interface data structure to that interface data structure, and data corresponding to a neighbor data structure to that neighbor data structure, and
responsive to the data structure not existing, return a NACK to the active OSPF instance to indicate dynamic OSPF data synchronization failed and clear dynamic OSPF data from the backup OSPF instance.

7. The network element of claim 6, wherein the active OSPF instance is further configured to:
   receive a set of dynamic OSPF data from one or more other network elements;
   add the set of dynamic OSPF data to one or more active data structures in the active OSPF instance, wherein the addition of the set of dynamic OSPF data to the one or more active data structures is an OSPF data synchronization event.

8. The network element of claim 6, wherein the backup OSPF instance is further configured to:
   determine whether the backup OSPF instance is in a state that allows for the addition of dynamic OSPF data in response to the backup OSPF instance receiving first set of OSPF synchronization; and
   responsive to the backup OSPF instance being in a state that does not allow for the addition of dynamic OSPF data, return a NACK to the active OSPF instance to indicate dynamic OSPF data synchronization failed and clear dynamic OSPF data from the backup OSPF instance.

* * * * *